Patented Sept. 30, 1941

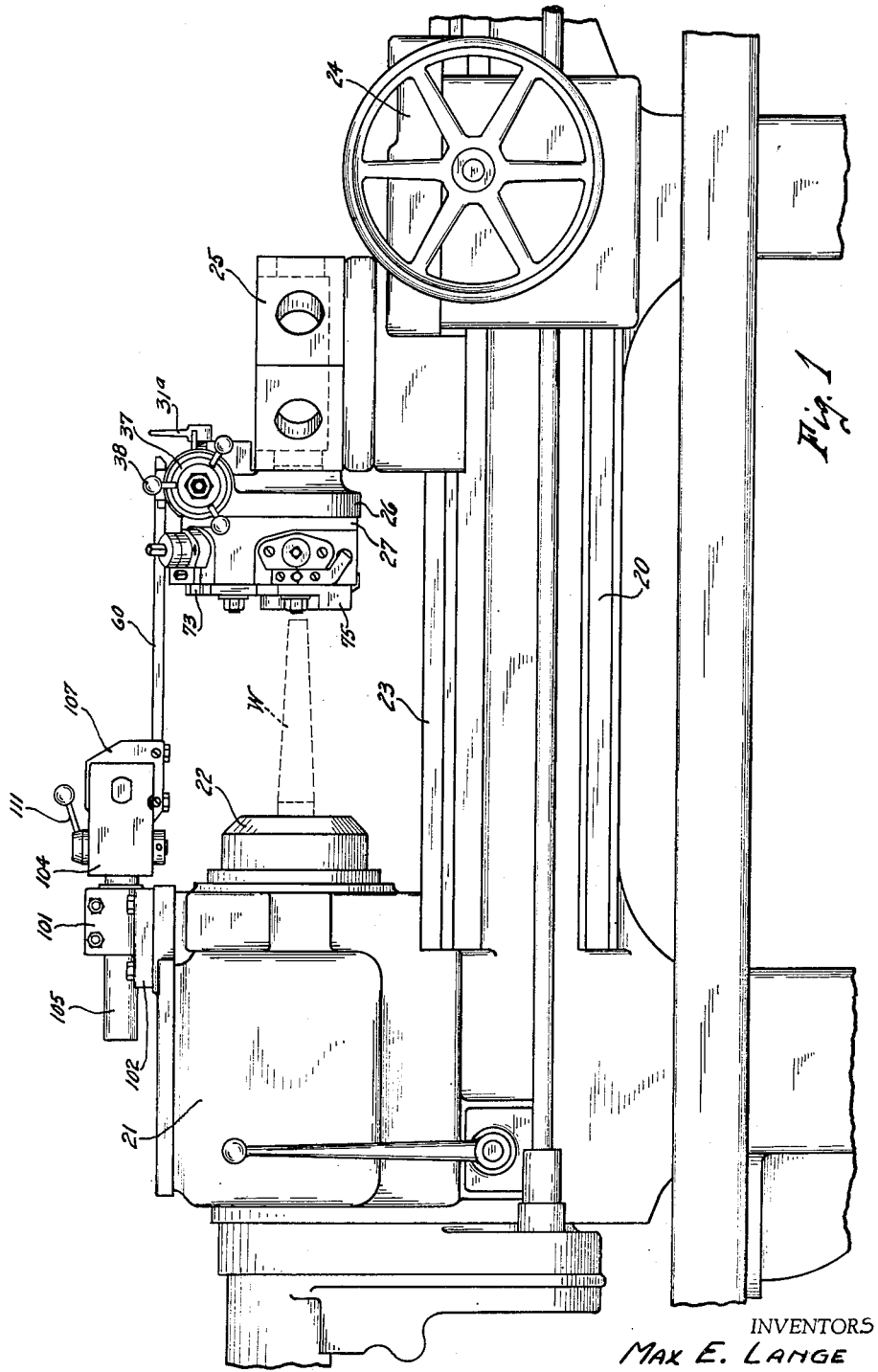

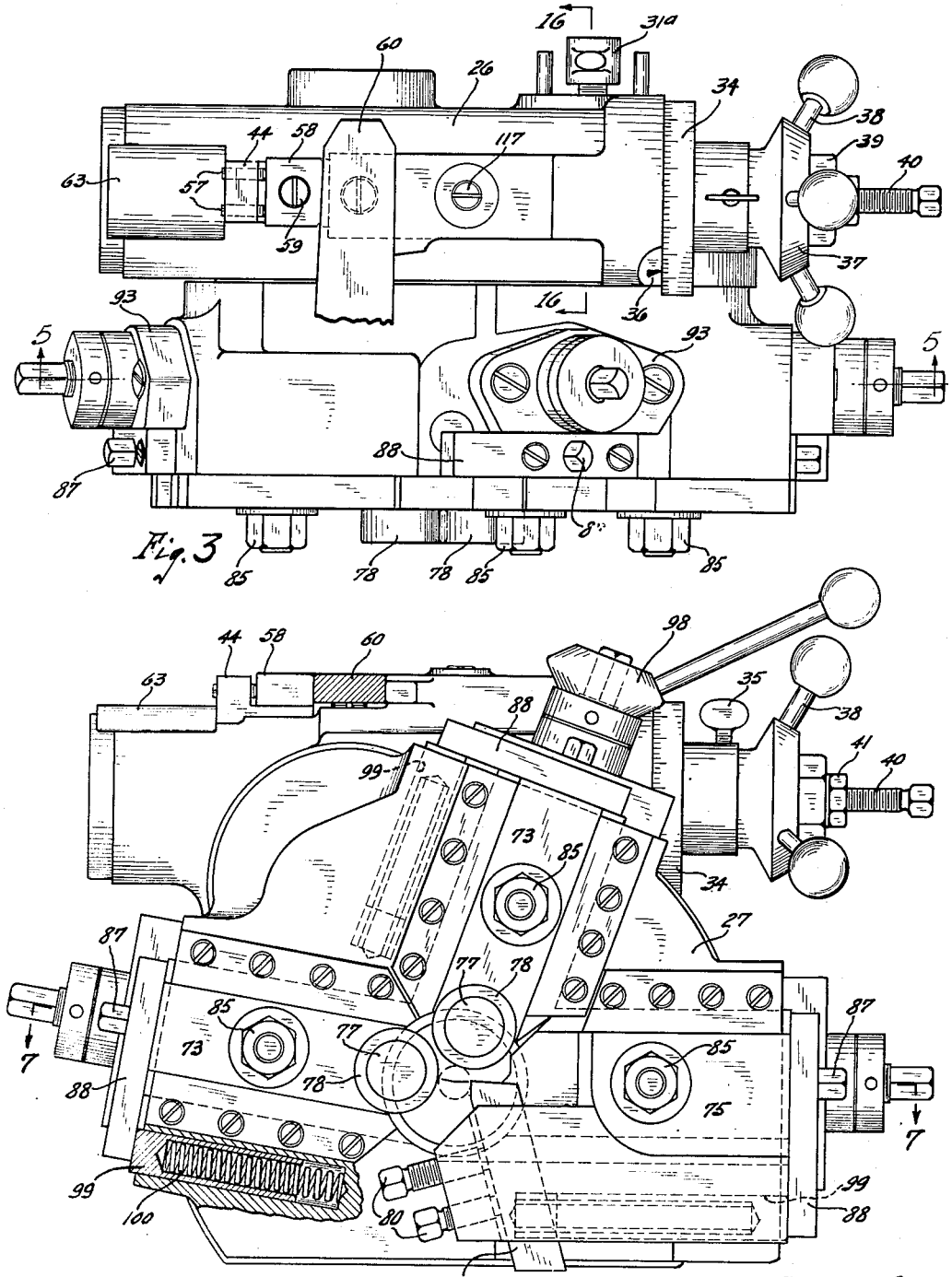

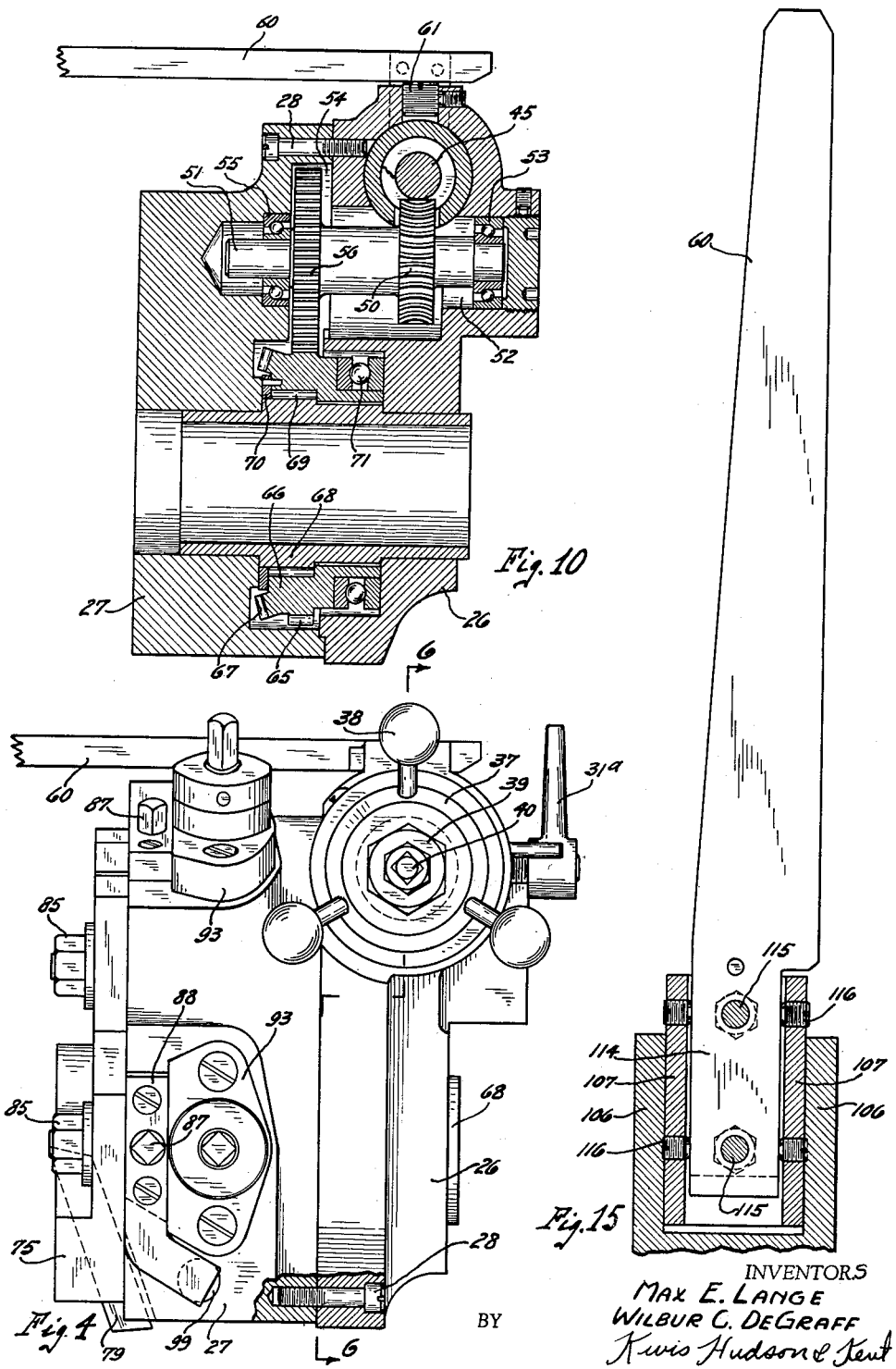

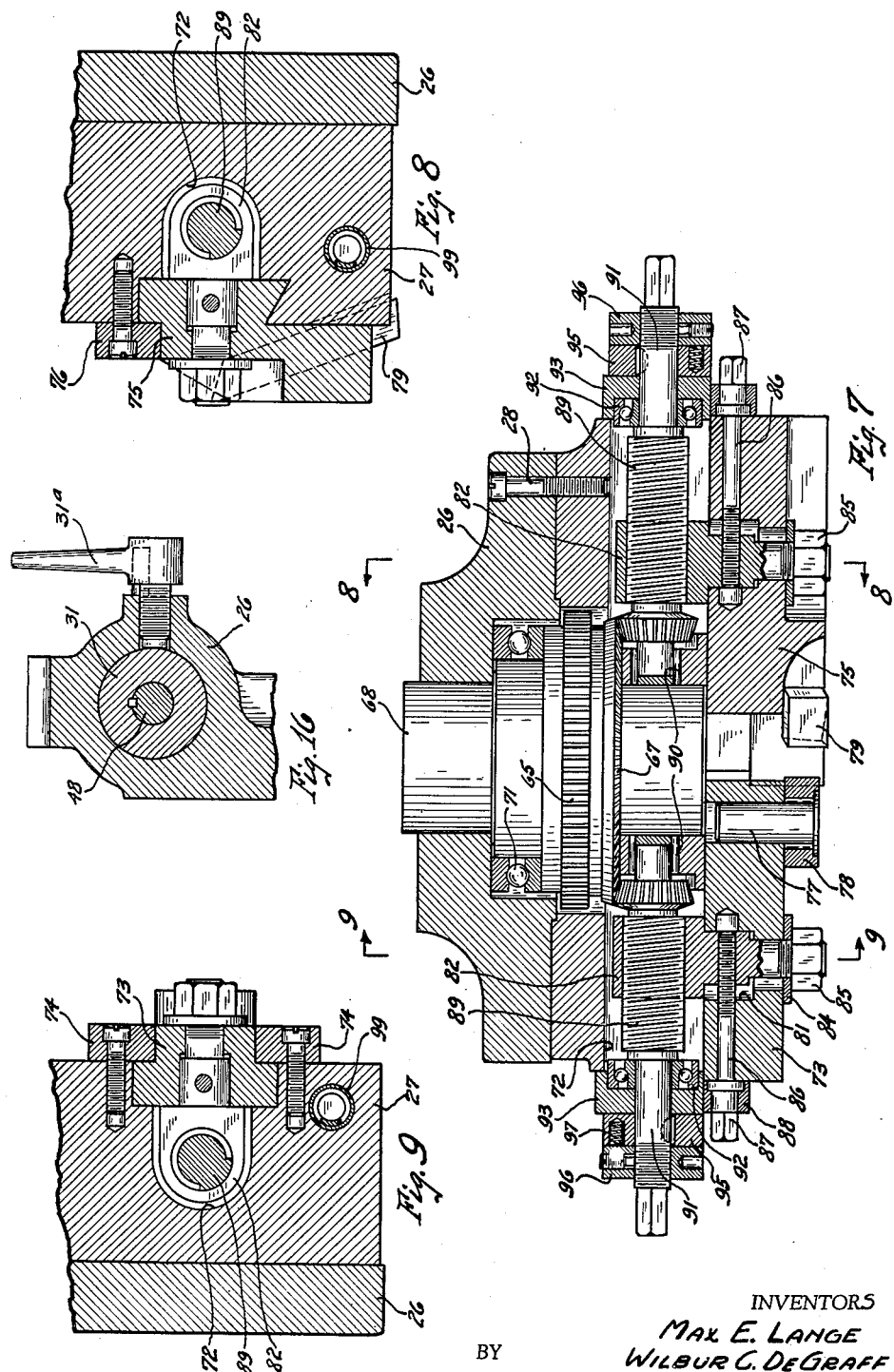

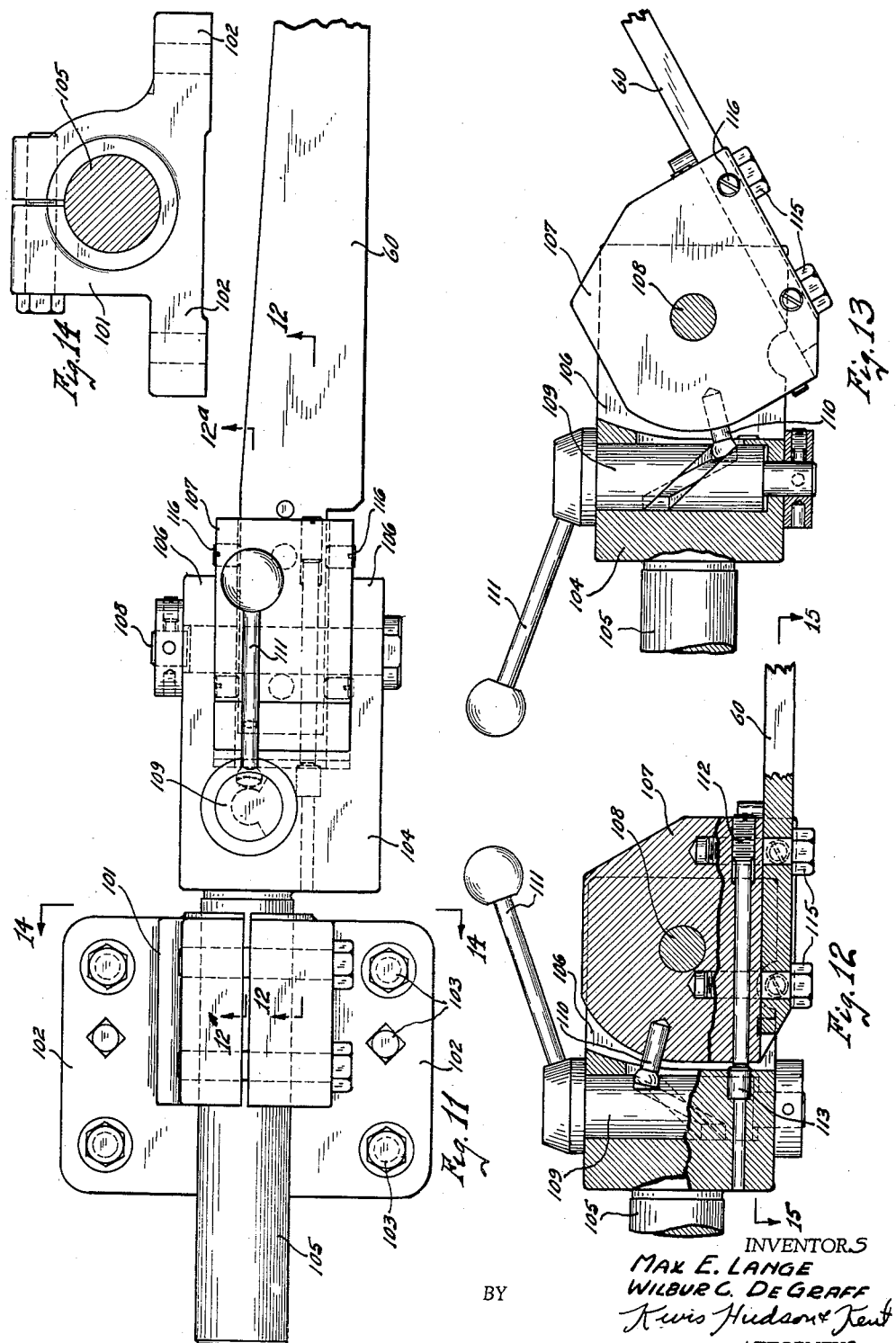

2,257,503

UNITED STATES PATENT OFFICE 2,257,503

TURNING TOOL

Max E. Lange, Cleveland Heights, and Wilbur C. De Graff, South Euclid, Ohio, assignors to The Warner & Swasey Company, Cleveland, Ohio, a corporation of Ohio Application May 26, 1938, Serial No. 210,136

26 Claims. (Cl. 82—17)

This invention relates to a turning tool for use with machine tools.

An object of the invention is to provide an improved turning tool which is so constructed that the slides carrying the cutting tool and the thrust resisting members will be moved relative to the work by a cam bar with an exactly equalized movement, wherefore the tool will be efficient in operation and will form the workpiece exactly corresponding to the shape of the camming portion of the cam bar.

Another object is to provide an improved turning tool which embodies means for accurately and readily adjusting the cutting tool and thrust resisting members with respect to the diameter of the workpiece and means for accurately returning the cutting tool and thrust resisting members to said adjusted position after each cutting operation has been performed upon a work piece.

Another object is to provide an improved turning tool wherein the slides carrying the cutting tool and the thrust resisting members are, upon the completion of the machining of a work piece, locked or retained in their outer positions out of engagement with the workpiece, so that they can be withdrawn from the workpiece preparatory to mounting a new work piece in operative position, whereupon they may be manually brought into cutting position by an equalized movement.

A further object is to provide an improved turning tool wherein the slides carrying the cutting tool and thrust resisting members are urged outwardly by spring pressure while rotating screws control the outward movement of the slides under the spring pressure in accordance with the shape of the camming portion of the cam bar.

A still further object is to provide a turning tool such as specified in the last named object and wherein frictional resistance is provided on the screws controlling the movement of the slides such that said screws will not rotate from vibration and back-lash will be eliminated.

A still further object is to provide in a turning tool a worm and worm wheel for moving the slides carrying the cutting tool and thrust resisting members with an equalized movement and which is so arranged that the worm may be manually rotated to adjustably move the slides to position the tool and thrust resisting members with respect to the work, but when an actual machining operation is taking place the worm is axially moved under the control of the cam bar and acts as a rack to move said slides in predetermined relationship with the shape of the camming portion of said cam bar.

A still further object is to provide an improved turning tool wherein the cam bar can be moved by means of a manually operated handle and cam mechanism to an inoperative position when not in use, wherefore it will not interfere with the other parts of the machine.

Further and additional objects and advantages not hereinbefore referred to will become apparent hereinafter during the description which is to follow of an embodiment of the invention.

Referring to the accompanying drawings illustrating said embodiment,

Fig. 1 is a front elevational view of a turret lathe having a turning tool embodying the invention associated with the turret thereof, while a tapered cam bar is associated with the headstock.

Fig. 2 is an elevational view on a larger scale than Fig. 1 of the turning tool, certain portions being broken away and shown in section, the view being taken looking at the tool from the left as viewed in Fig. 1.

Fig. 3 is a top plan view of the turning tool.

Fig. 4 is a side elevational view of the turning tool taken from the front side of the turret lathe shown in Fig. 1.

Fig. 7 is a sectional view taken substantially on line 7—7 of Fig. 2 looking in the direction of the arrows.

Figs. 8 and 9 are fragmentary sectional views taken respectively on lines 8—8 and 9—9 of Fig. 7 looking in the direction of the arrows.

Figure 5:
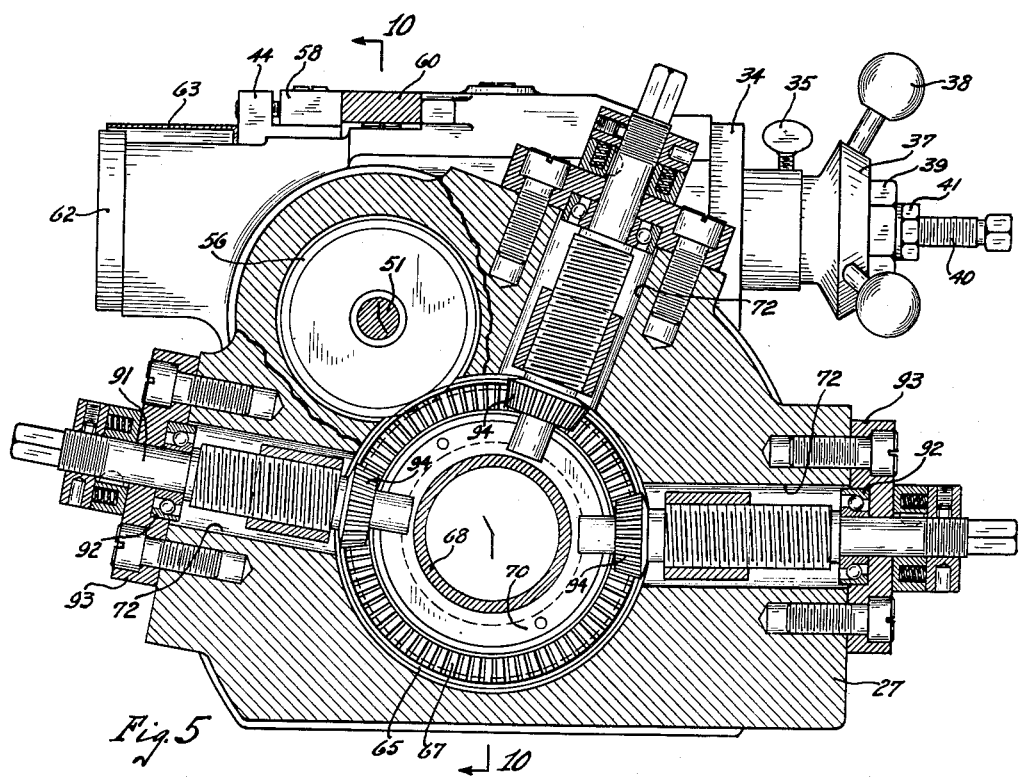
Fig. 5 is a sectional view taken substantially on line 5—5 of Fig. 3 looking in the direction of the arrows.

Fig. 10 (sheet 3) is a sectional view taken on irregular line 10—10 of Fig. 5 looking in the direction of the arrows.

Fig. 11 is a fragmentary top plan view of the tapered cam bar shown in Fig. 1 and its mounting on the headstock of the lathe.

Fig. 12 is a fragmentary sectional view with the portion thereof above the broken away line being taken substantially on line 12a—12a of Fig. 11 looking in the direction of the arrows, while the portion thereof below the broken away line is taken substantially on line 12—12 of Fig. 11 looking in the direction of the arrows.

Fig. 13 is a view similar to Fig. 12 with the sectional part thereof taken along the line 12a—12a of Fig. 11 but with the cam bar and its mounting shown in elevation and moved to an inoperative position.

Fig. 14 is a partial elevational and sectional view taken substantially on line 14—14 of Fig. 11 looking in the direction of the arrows.

Fig. 15 (sheet 3) is a sectional view taken substantially on line 15—15 of Fig. 12 looking in the direction of the arrows but with the tapered cam bar shown in elevation, and Fig. 16 is a fragmentary sectional view taken on line 16—16 of Fig. 3 looking in the direction of the arrows.

The turret lathe illustrated in Fig. 1 comprises a bed 20 provided at one end with a headstock 21 in which is rotatably mounted the work spindle 22 that extends parallel with the ways 23 formed on the upper side of the bed and upon which is slidably mounted a turret slide 24 provided with an indexible turret 25. The elements of the turret lathe just referred to are well known in the art and per se form no part of the present invention.

The turning tool comprises a body portion 26 and a body portion 27, the two body portions being secured together by a number of screws 28, as indicated in Figs. 4, 7 and 10. The two body portions are aligned with each other by means of a circular boss on the portion 26 which interfits with a recess on the portion 27 (see Figs. 6 and 10).

The body portion 26 is secured to a face of the turret 25, as indicated in Fig. 1, by suitable securing means as will be well understood in the art, a suitable centralizing pilot being employed to fit in the hole of the turret face and which will later be referred to.

Figure 6:
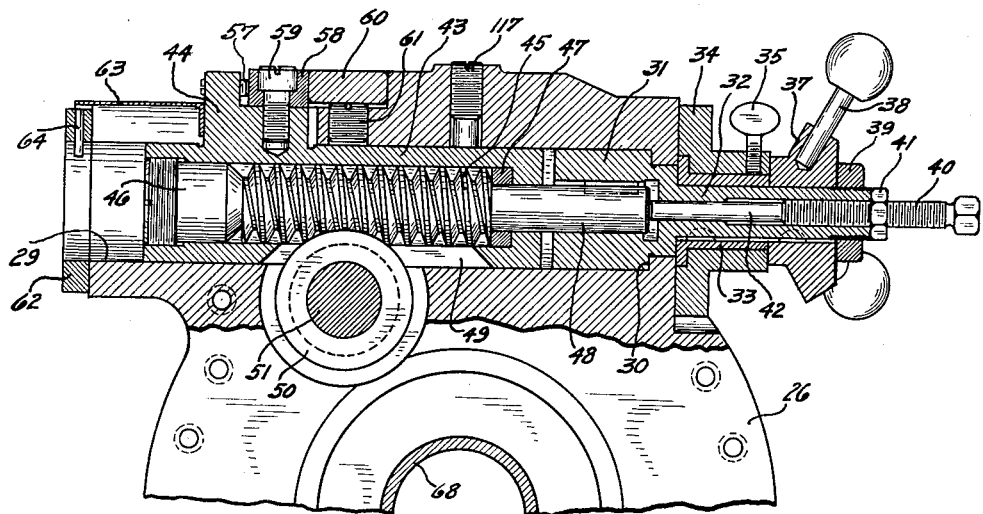
Fig. 6 is a fragmentary sectional view taken substantially on line 6—6 of Fig. 4 looking in the direction of the arrows.

The body portion 26 adjacent its upper end is provided with a circular opening 29 extending in a direction transverse to the ways of the bed when the tool is mounted on the turret, as shown in Fig. 1, and said opening is provided adjacent one end with a shoulder 30, as clearly shown in Fig. 6. A bearing sleeve 31 is mounted in the opening 29 and has a portion engaging the shoulder 30 and a reduced portion 32 extending outwardly of the opening and having mounted thereon and keyed thereto a bushing 33 provided with a flange that engages the outer side of the body, as clearly indicated in Fig. 6, whereby said bearing sleeve is held against endwise movement but is freely rotatable.

A dial 34 is mounted on the bushing 33 and can either rotate thereon or be locked thereto by means of a thumb screw 35. The dial 34 is provided with graduations and also may have suitable indicia associated with the graduations, and said graduations can be brought into alignment with a pointer 36 located on the body portion 26 (see Fig. 3).

Outwardly of the dial 34 a knob 37 is keyed to the reduced portion 32 of the sleeve 31 and is provided with a number of outwardly extending operating handles 38. The reduced portion 32 of the sleeve 31 is externally threaded at its outer end to receive a clamping nut 39, and is internally threaded to receive an adjustable stop screw 40 which can be locked in adjusted position by means of a lock nut 41. The stop screw 40 extends inwardly of the reduced portion 32 of the sleeve and is provided adjacent its inner end with a reduced extension 42 that may extend for a greater or lesser distance into the bore of the bearing sleeve 31, as clearly indicated in Fig. 6 for a purpose which will later become apparent.

The description thus far given clearly shows that when the knob 37 is rotated the bearing sleeve 31 will be rotated in turn and also that the dial 34 can be adjustably positioned relative to the bearing sleeve, and then when clamped by the thumb screw 35 will rotate with said sleeve as a unit.

A tubular slide 43 is mounted in the opening 29 and this slide has an upwardly projecting tongue 44 which extends through a slot formed in the body portion 26, as clearly indicated in Fig. 6. The slide 43 houses a worm 45 intermediate a closure plug 46 screwed into one end of the slide and a ring 47 mounted in the slide adjacent its other end. The worm 45 is provided with a reduced cylindrical extension 48 that passes through a central opening in the inner end of the slide 43 and extends into the bore of the bearing sleeve 31 and is keyed to said sleeve. The bearing sleeve 31 is provided with an elongated keyway in which the key on the extension 48 engages, wherefore it will be seen that when the sleeve 31 is rotated by the knob 37 the worm 45 will also be rotated. The bearing sleeve 31 and worm 45 can be locked against rotation by a lock screw 31a having a handle portion movable between spaced stop pins (see Figs. 3, 4 and 16).

It will further be seen that when the tubular slide 43 is moved endwise the worm 45 will likewise move endwise therewith as a unit, but that due to the elongated keyway in the bearing sleeve 31 the driving relationship between the bearing sleeve and the worm will not be broken.

The tubular slide 43 is provided with an elongated slot 49 so that a worm wheel 50 can intermesh with the worm 45 and be rotated thereby when the latter is rotated, but will also be rotated when the worm moves bodily endwise with the slide 43, at which time the worm 45 acts as a rack as will later be referred to.

The worm wheel 50 is formed integral with a shaft 51 mounted in an opening 52 formed in the body portion 26 and extending transversely to the opening 29, said shaft 51 being rotatably supported at one end in a suitable antifriction bearing 53 arranged in the opening 52 (see Fig. 10). The shaft 51 extends into a recess 54 in the body portion 27, as clearly shown in Fig. 10, and is rotatably supported therein by a suitable antifriction bearing 55. The shaft 51 is provided with a spur gear 56 formed integral with the shaft and located in the recess 54 of the body portion 27. In order to facilitate the adjustment of the antifriction bearings 53 and 55 a screw plug is mounted in the outer end of the opening 52 in the body portion 26, as clearly shown in Fig. 10 and said plug can be locked in adjusted position by means of a suitable lock screw.

The tubular slide 43 has been described as provided with an upwardly extending tongue 44 that projects into a slot formed in the body portion 26. The tongue 44 is provided with a pair of adjusting screws 57 (see Fig. 3) that contact with one side of a follower block 58 mounted on a screw 59 centrally located in the block and permitting the block to be angularly adjusted thereon by means of the screws 57 to adapt itself to the taper on the cam bar with which the block cooperates. In the event that a cam bar is used which does not have a straight camming surface but an irregular one a different and suitable follower block may be employed.

Reference to Figs. 2, 3, 5 and 6 will clearly indicate the manner in which the follower block 58 cooperates with the camming edge of a cam bar 60 that extends between the block and a shoulder forming a heel on the body portion 26. The cam bar is clearly illustrated in Fig. 15, and it will be noted that in this instance it is provided with a straight edge that contacts the heel on the body portion 26, while its camming edge is tapered and contacts the follower block 58. It will be understood that differently shaped cam bars might be employed. The cam bar is suitably positioned and supported, in this instance, by means carried by the head stock 21 and which will later be referred to.

The body portion 26 is provided with an adjustable contact plug 61 located beneath the cam bar 60 for the purpose of bringing the cam bar into parallelism with the ways 23 of the machine. The plug 61 may be locked in adjusted position in any suitable manner as, for example, by means of a lock screw as shown in Fig. 10.

It will be seen that when the turret slide is fed along the ways 23 toward the head 21 the cam bar 60 which is stationary will ride upon the upper end of the plug 61 between the heel of the body portion 26 and the follower block 58, and consequently will cause an outward or left hand movement, as viewed in Fig. 6, of the slide 43 in accordance with the taper on the cam bar. When the slide 43 is thus moved outwardly the worm 45 will move therewith as a unit and will act as a rack to turn the worm wheel 50.

As previously stated the body 26 is provided with a slot through which the tongue 44 of the slide 43 extends, and in order to prevent foreign matter from entering said slot a ring 62 is secured to the body portion 26 at the end of the opening 29, while a cover plate 63 secured to the tongue 44 of the slide 43 projects over the slot in the body portion and over the ring. The ring 62 carries a pin 64 which acts as a stop to limit the outward or left hand movement of the slide 43.

The spur gear 56 of the shaft 51 meshes with a spur gear 65 formed integral with a ring gear 66 which also has formed on one end thereof a bevel gear 67. The ring gear 66 is arranged partly in a recess formed in the body portion 26 and partly in a recess formed in the body portion 27 and is mounted on a centrally arranged sleeve 68 located in aligned central openings of the portions 26 and 27. Interposed between the ring gear and the sleeve 68 are needle bearings 69 held in position by a plate 70 pinned to the ring gear. Antithrust bearings 71 are interposed between a shoulder portion of the ring gear 66 and a part of the body portion 26, as clearly indicated in Fig. 10. The end of the sleeve 68 which projects beyond the body portion 26 serves as a pilot to locate the turning tool on the face of the turret.

The body portion 27 is provided with three cored openings 72 extending radially from the central opening in the body, as clearly shown in Fig. 5. The outer face of the body portion 27 is provided with guideway recesses substantially coextensive with the openings 72 and arranged symmetrically with respect to the longitudinal center line of said openings and communicating therewith. The guideway recesses associated with two of the openings 72 are shaped as indicated in Fig. 9, i. e., are right angle recesses, while the recess associated with the other opening 72 is shaped as indicated in Fig. 8, namely, one of its longitudinal edges is dove-tailed for a purpose later to be explained.

Mounted in the right angle recesses are right angle slides 73 which are held in the recesses by guide strips 74 secured to the face of the body portion 27 on opposite sides of the slides 73. A slide 75 is associated with the dove-tailed recess and is provided with a dove-tailed portion complementary to said recess, wherefore said slide is held in position in the recess by means of a guide strip 76 secured to the face of the body and by the interengagement of the dove-tails.

The slides 73 are provided at their inner ends with bearing pins 77 upon which are rotatably mounted thrust resisting rollers 78, needle bearings being interposed between said rollers and said pins. It will be understood that various forms of thrust resisting rollers may be employed according to the shape of the camming edge of the cam bar. The slide 75 at its inner end is provided with an opening in which a cutting tool 79 can be clamped by means of suitable clamping screws 80 (see Fig. 2).

It will be noted that the cutting tool 79 is disposed at an acute angle to the path of movement of the slide (a portion of the body being cutaway to provide clearance therefor) and since the thrust exerted on the slide when the cutting tool is operating upon a work piece is in the direction of the angle of disposition of the tool, it will be understood that the dove-tail engagement between the slide and its recess guideway effectively assumes such thrust.

The slides 73 and 75 are each provided intermediate their ends with an opening 81 extending therethrough and communicating with the opening 72 (see Fig. 7). In each of the openings 72 there is mounted a nut 82 which has a reduced portion 83 extending into the opening 81 in the slide and provided at its outer end with a reduced threaded portion extending outwardly of the slide. It will be noted that the reduced portion 83 and the threaded portion thereof are of such size that the nut can be adjusted in the openings 81 lengthwise of the slide and can then be clamped in adjusted position by means of a washer 84 and a nut 85 screwed on the outer end of the threaded portion of the nut 82.

Each of the slides 73 and 75 is provided with an adjusting screw 86 extending in a direction longitudinally of the slide and passing through a threaded opening formed in the reduced portion 83 of the nut 82. The adjusting screw 86 is provided exteriorly of the slide with a shouldered head 87, passing through a shouldered opening in a strap 88 secured to the outer face of the slide, as clearly shown in Figs. 2, 3, 4 and 7.

It will be seen that when the nuts 85 are loosened a rotation of the screws 86 will effect a linear adjustment of the slides 73 and 75 relative to the nuts 82, after which the nuts 85 may be tightened to clamp the slides and nuts 82 in adjusted position.

Mounted for rotation in each of the openings 72 is a rotatable slide moving screw 89 having at its inner end a reduced portion rotatably supported in a needle bearing indicated generally at 90 and located in the body portion of the tool. The screw 89 is provided with a reduced cylindrical outer end 91 which extends through an antifriction bearing 92 carried by a cap 93 secured to the body portion 27 by suitable screws, as indicated in Figs. 3, 4, 5 and 7.

The screws 89 have threaded engagement with the nuts 82 and are provided intermediate the nuts 82 and the needle bearings 90 with bevel pinions 94 formed integral, in this instance, with the screws and meshing with the bevel ring gear 67, as clearly indicated in Figs. 5 and 7, wherefore rotation of the ring gear will cause an equalized rotation of the screws 89 and an equalized linear movement of the slides 73 and 75. The reduced portions 91 of the screws 89 outwardly of the caps 93 have keyed thereto collars 95 capable of endwise movement on the reduced portions but held in frictional engagement against the outer side of the caps 93 by means of nuts 96 screwed on the threaded outer ends of the reduced portions 91 and locked in position thereon by suitable lock screws.

The collars 95 are provided at their outer faces with a plurality of circularly spaced recesses in which are housed coil springs 97 that engage the inner face of the nuts 96 and act to hold the collars in frictional engagement with the outer face of the caps 93, wherefore it will be seen that a friction slip device is provided for the slide moving screws 89 such that said screws will not move under vibration and can only be rotated through the bevel ring gear 67, or manually by means of a wrench applied to the outer end of the reduced portions 91 of the screws, as indicated at the upper side of Fig. 2, wherein a wrench 98 is shown applied to the end of one of the screws.

The straps 88 have end portions extended beyond the slides 73 and 75 to which the straps are connected, and these end portions are so disposed as to be contacted by plungers 99 mounted in recesses formed in the body portion 27 and urged in an outward direction by coil springs 100, as clearly shown in one instance in full lines and in the other instances in dotted lines in Fig. 2.

It will be seen that the spring pressed plungers 99 tend to move the slides in an outward direction and that the outward movement under the urge of the spring pressed plungers is controlled by the rotation of the screws 89, which, as has been stated, are threadedly engaged with the nuts 82 carried by the slides and which screws are rotated with an equalized movement by the bevel ring gear 67, that is, the slides are allowed to move outwardly under the spring pressure by the equalized rotation of the screws 89.

It will be seen that the outwardly acting constant spring pressure on the slides prevents any back-lash occurring between the nuts and the screws, while, as has already been pointed out, the friction slip device on the screws 89 prevents the screws from rotating under vibration.

As previously stated the tapered cam bar 60, in this instance, is supported by a device mounted on the head stock 21 of the machine and this device will now be explained.

A bracket 101 having a split bearing is provided on its opposite edges with attaching flanges 102 which engage the upper side of the cover plate of the headstock and are secured thereto by suitable dowels and securing screws indicated generally at 103 in Fig. 11. The cam bar supporting member has a body 104 provided on its rear end with an extended cylindrical shank 105 that passes through the split bearing of the bracket 101 and is clamped therein. The shank 105 is of such length that the cam bar can be adjusted to variable distances from the headstock as may be required.

The outer end of the body 104 is provided with spaced ears 106 which straddle a rockable support 107 to the outer end of which the cam bar is connected, as will later be explained. The support 107 is rockably mounted between the ears 106 on a bearing bolt 108 mounted in aligned openings formed in the ears.

Intermediate the ears 106 and the shank 105 the body 104 is provided with a vertically extending opening in which is rotatably mounted a cam in the form of a shaft 109 provided with a cam groove into which extends the spherical end of a follower pin 110 carried by the support 107, as clearly indicated in Figs. 11, 12 and 13. The upper end of the cam 109 is provided with an operating handle 111, whereby the cam can be rocked to move the support 107 from the position shown in Fig. 12 to the position shown in Fig. 13 or vice versa, it being understood that when the support is in the position shown in Fig. 13 it will be held in such position due to the shape of the cam slot.

The support 107 is provided with an adjustable abutting screw 112, the rear or left hand end of which, as viewed in the drawings, contacts with an abutment plug 113 carried by the body 104 when the support is in the position shown in Fig. 12. It will be understood that the adjustable abutment screw can be adjusted so that the underside of the cam bar 60 will lie in parallelism with the ways 23 of the bed. It will also be understood that the engagement between the screw 112 and the abutment plug 113 takes the thrust due to the weight of the support 107 and the cam bar 60 and thus relieves the pin 110 of this thrust.

The lower edge of the support 107 is provided with a groove of slightly greater depth than the thickness of the cam bar 60, and this groove receives the reduced attaching end 114 of the cam bar, which end is of slightly less width than the width of the groove (see Fig. 15). The cam bar is secured to the supporting member 107 by means of securing bolts 115 which pass upwardly through the cam bar and into the supporting member, as clearly shown in Fig. 12. The supporting member 107 at the opposite sides of the groove in its bottom edge is provided on each side of the groove with a pair of spaced adjusting screws 116 that contact the edges of the attaching portion 114 of the cam bar, and these screws are for the purpose of bringing the straight edge of the cam bar into parallelism with the ways 23 of the machine (see Fig. 15). It will be understood that when these adjusting screws 116 have brought the straight edge of the cam bar into parallelism with the ways of the machine that then the attaching bolts 115 are screwed tightly into position and the cam bar is rigidly connected to the supporting member 107.

Assuming that the turning tool is secured to a face of the turret 25 and that a suitable cam bar 60 is secured to the support 107 and that a work piece W is mounted in the chuck of the work spindle 22, the operator by means of the handle 111 brings the cam bar from the position shown in Fig. 13 to the horizontal position shown in Figs. 1 and 12. Further assuming that the cutting tool 79 is properly positioned in the slide 75 and that the slides 73 and 75 have been adjusted by means of the screws 86 to bring the thrust resisting rollers 78 and the cutting tool 79 into proper position with respect to the diameter of the work, the operator then moves the turret slide toward the head stock 21 until the position indicated in Fig. 1 has been reached, at which time the tip of the cam bar 60 is located between the follower block 58 and the heel of the body portion 26.

The operator then adjusts the follower block 58 with respect to the camming edge of the cam bar by means of the adjusting screws 57, it being understood that the slide 43 and the follower block has been moved toward the right, as viewed in Fig. 6 by manual rotation of the wrench 98, which, of course, effects a rotation of the worm wheel 50 and an endwise movement to the worm 45 and slide 43.

The tubular slide 43 now being held against further movement toward the right, as viewed in Fig. 6, the operator then rotates the knob 37 to cause a rotation of the worm 45 and, in turn, through the worm wheel and ring gear a movement of the slides 73 and 75 to their inward position corresponding substantially to the minimum diameter to be cut on the work piece. The operator then adjusts the stop screw 40 to bring the inner end of the reduced portion 42 thereof into abutting contact with the end of the cylindrical extension 48 of the worm 45 and locks said adjusting screw 40 in such position by means of the lock nut 41. He may then relieve the thumb screw 35 and turn the dial 34 to bring a certain indicium into registration with the pointer 36, after which the thumb screw is again tightened to cause the dial 34 to rotate as a unit with the knob and sleeve 31.

The turning tool is now adjusted and positioned for the machining of the work piece. It will be understood that as the turret slide 24 is fed toward the headstock the cam bar 60 acting on the follower 58 will cause the tubular slide 43 to move toward the left as viewed in Fig. 6 and that the worm 45 moving bodily therewith functions as a rack to rotate the worm wheel 50 and through the spur gears 56 and 65 and bevel gear 67 impart an equalized rotation to the bevel pinions 94 on the screws 89. At this time the bearing sleeve 31 and worm will be locked by the lock screw 31a against rotation. The equalized rotation of the screws 89 acting through the nuts 82 allows an equalized outward movement of the slides 73 and 75 under the pressure of the springs 100 and such equalized outward movement of the slides is in accordance with the shape of the camming edge of the cam bar 60. During this rotation of the screws 89 there will be no backlash or movement of the screws due to vibration because of the friction slip devices for the screws acting on the stationary caps 93.

The cutting operation continues until the machining of the work piece has been completed, at which time the operator stops the feed of the turret slide. The operator may then cause the turret slide to move rearwardly until free of the work piece, and during such movement the cutting tool and thrust resisting rollers will not score the machined surface of the work piece since they remain in their outer positions and out of contact with the work piece due to the fact that the threads of the screws 89 and nuts 82 have a locking angle. Also, during this rearward movement of the turret slide the follower 58 will remain in its outer position and be out of contact with the camming edge of the cam bar 60.

When the finished work piece has been unloaded and a new work piece loaded in the chuck of the work spindle, the turret slide is moved to a starting position, after which the operator by means of the wrench 98 moves the slide 43 toward the right, as viewed in Fig. 6, until the end of the cylindrical extension 48 of the worm 45 contacts the inner end of the reduced portion 42 of the stop screw 40, whereupon he may proceed as already explained to machine the new work piece.

Although the turning tool has been illustrated and described as employed for machining a work piece tapered throughout its length it will be understood that it could be employed for machining a work piece which has combined straight and tapered portions. In such instances when the straight portion is to be machined and the cam bar is not to be employed, assuming the dial 34 has been set with respect to the pointer 36 for the diameter of the straight portion, the operator by means of the wrench 98 moves the slide 43 and worm 45 until the end of the extension 48 abuts the inner end of the screw 40. He then locks the slide 43 against endwise movement by the lock screw 117 and then by rotating the knob 37 rotates the worm 45 until the graduation on the dial that corresponds to the desired diameter is again in registry with the pointer 36. The turning tool can also be employed with cam bars having irregular or curved camming surfaces as distinguished from tapered or straight camming surfaces and in such instances suitably shaped followers will be used. The tool may also be employed as a single cutter turner by adjusting the cutting tool and thrust resisting rollers for a given diameter and then locking the slide 43 and worm 45 against endwise movement and rotation, respectively, as explained above in connection with the straight portions of a combined tapered and straight work piece.

Although the worm 45 has been described as moving the cutting tool slide and thrust resisting members through gearing, screws and nuts it will be understood that said worm might also move said slides through the medium of cam or lever mechanisms as is known in the art.

Although a preferred embodiment of the invention has been illustrated and described herein it will be understood that the invention is susceptible of various modifications and adaptations within the scope of the appended claims.

Having thus described our invention, we claim:

1. In a turning tool adapted to be mounted on the face of a turret of a machine tool, a slide, a worm carried by said slide for axial movement therewith or for rotation thereon, means on said slide for resisting the thrust of said worm, a movable support for carrying a cutting tool, operative connections including a worm wheel between said support and said worm, means for rotating said worm to move said support, and means for moving said slide and said worm endwise simultaneously therewith to also move said support.

2. In a turning tool adapted to be mounted on the face of a turret of a machine tool, a slide, a worm carried by said slide for endwise movement therewith but mounted for rotation thereon, means on said slide for resisting the thrust of said worm, a movable support for carrying a cutting tool, operative connections including a worm wheel between said support and worm, means for rotating said worm to move said support, means for locking said worm against rotation, and means for moving said slide and said worm endwise simultaneously therewith to move said support.

3. In a turning tool adapted to be mounted on the face of a turret of a machine tool, a slide, a worm carried by said slide for movement axially therewith or for rotative movement thereon, means on said slide for resisting the thrust of said worm, a movable support for carrying a cutting tool, operative connections including a worm wheel between said support and said worm, means for rotating said worm to move said support, means for moving said slide and said worm simultaneously and in one direction to move said support, means for moving said slide and worm support, means for moving said slide and worm simultaneously and in the opposite direction, and adjustable stop means for limiting the last named movement of said slide and worm.

4. In a turning tool, a slide, a worm carried by said slide for axial movemen therewith or for rotation thereon, means carried by said slide for resisting the thrust of said worm, movable supports for carrying either a cutting tool or a thrust resisting member, operative connections including a worm wheel between said supports and said worm, means for rotating said worm to move said supports, and means for moving said slide and worm as a unit in the direction of the axis of the worm to also move said supports.

5. In a turning tool of the character described, a slide, a worm carried by said slide for axial movement therewith or for rotative movement thereon, movable supports for carrying either a cutting tool or a thrust resisting member, operative connections between said supports and said worm, means for rotating said worm to move said supports, means for moving said slide and said worm as a unit and in one direction to move said supports, means for moving said slide and worm as a unit in the opposite direction, and adjustable stop means for limiting the last named movement of said slide and worm.

6. In a turning tool of the character described, a slide, a worm carried by said slide for movement axially therewith as a unit or for rotative movement thereon, movable supports for carrying either a cutting tool or a thrust resisting member, operative connections between said supports and worm, means for rotating said worm to move said supports, means for locking said worm against rotation, means for moving said slide and worm as a unit in one direction to move said supports, means for moving said slide and worm in the opposite direction as a unit, and adjustable stop means for limiting the last named movement of said slide and worm.

7. In a turning tool of the character described, a slide, a worm carried by said slide for movement axially therewith as a unit or for rotative movement thereon, movable supports for carrying either a cutting tool or a thrust resisting member, operative connections between said supports and said worm, means for rotating said worm to move said supports, means for locking said worm against rotation, means for moving said slide and worm as a unit in one direction to move said supports and including a cam bar having movement relative to said slide, means for moving said slide and worm as a unit in the opposite direction, and adjustable stop means for limiting the last named movement of said slide and worm.

8. In a turning tool of the character described, a worm mounted for either rotative or axial movements, a movable support for carrying a cutting tool, and operative connections between said support and said worm for moving the support upon either movement of the worm and including a screw and nut associated with said support, and gearing associated with said worm and said screw including a worm wheel meshing with said worm.

9. In a turning tool of the character described, a worm mounted for either rotative or axial movements, movable supports for carrying either a cutting tool or a thrust resisting member, and operative connections between said supports and said worm for moving the supports with an equalized movement upon either movement of the worm and including a worm wheel meshing with the worm, nuts carried by said supports, screws operatively associated with said nuts, and gearing operatively associated with said screws and said worm wheel.

10. In a turning tool of the character described, a body, a support for a cutting tool and movably mounted on said body, a movable member carried by said body for actuating said support, a positive drive for said member and means carried by said member and engaging said body for imposing a frictional resistance to movement of said member.

11. In a turning tool of the character described, a body, a support for carrying a cutting tool movably mounted on said body, a screw carried by said body and operatively associated with said support for moving the latter, a positive drive for said screw, and means carried by said screw for imposing a frictional resistance to rotation between said screw and body.

12. In a turning tool of the character described, a body, a support for a cutting tool and movably mounted on said body, a screw carried by said body and operatively associated with said support for moving the latter, a positive drive for said screw, a member fixed to said screw in spaced relation with said body, and means carried by said screw and interposed between said member and body for imposing a frictional resistance to rotation of said screw.

13. In a turning tool of the character described, a body, a support for a cutting tool and movably mounted on said body, a nut carried by said support, a screw carried by said body and operatively associated with said nut, a positive drive for said screw, and means between said screw and body for imposing upon said screw a frictional resistance to rotation.

14. In a turning tool of the character described, a body, a support for a cutting tool and movably mounted on said body, a nut carried by said support, means carried by said support and operatively associated with said nut for adjusting the latter relative to the support, and means for locking said nut in adjusted position.

15. In a turning tool of the character described, a body, a support for a cutting tool and movably mounted on said body, pressure means acting to move said support in an outward direction, a screw operatively associated with said support and operable to control the movement of said support under said pressure means, and means for imposing upon said screw a frictional resistance to rotation thereof.

16. In a turning tool of the character described, a body carried thereby, a slide, a worm carried by said slide for axial movement therewith as a unit or for rotation thereon, supports for either a cutting tool or a thrust resisting member movably mounted on said body, means for rotating said worm, means for locking said worm against rotation, means for moving said slide and worm as a unit, operative connections between said supports and worm and including a ring gear, screws rotatable by said ring gear, nuts carried by said supports and operatively associated with said screws, and means for imposing on said screws frictional resistance to rotation thereof.

17. In a turning tool of the character described, a body, a slide carried thereby, a worm carried by said slide for axial movement therewith as a unit or for rotation thereon, supports for either a cutting tool or a thrust resisting member movably carried by said body, means for rotating said worm, means for moving said slide and worm in one direction as a unit, operative connections between said supports and worm and including a ring gear, screws operatively connected with said ring gear, and nuts carried by said supports and operatively associated with said screws, the rotation of said worm acting to move said supports and the movement of said slide and worm as a unit in one direction also acting to move said supports, means associated with one of said screws for rotating the same and moving said slide and worm as a unit in the opposite direction, and adjustable stop means for limiting the movement of said slide and worm as a unit in said last direction.

18. A support for a cam bar adapted to be secured to the head stock of a machine tool provided with ways, said support having adjustable means for securing the cam bar thereto and providing for adjustment of the cam bar in a horizontal plane for bringing the cam bar into parallelism with the ways of the machine.

19. A support for a cam bar and which is adapted to be secured to the headstock of a machine tool provided with ways, said support comprising means for securing the cam bar thereto, and horizontal adjusting means for bringing the edge of the cam bar opposite to the camming edge into parallelism with said ways.

20. A support for a cam bar adapted to be secured to the headstock of a machine tool provided with ways, said support comprising adjustable means for securing said cam bar to the support and for adjusting the same in two different planes into parallelism with the ways.

21. A cam bar supporting device comprising a body portion adapted to be connected to a machine tool and a cam bar supporting portion movably connected with said body portion, and cam means carried by said body portion and operatively associated with said supporting portion for moving the latter to effect a movement of the cam bar from operative to inoperative position.

22. A cam bar supporting device adapted to be associated with a machine tool and comprising a body portion and a cam bar supporting portion rockably mounted on said body portion, a rockable member mounted in said body portion and provided with a cam groove, and means carried by said cam bar supporting portion and operatively cooperating with said groove.

23. A cam bar supporting device comprising a body portion adapted to be connected to a machine tool, and a cam bar supporting portion rockably mounted on said body portion and movable from an operative to an inoperative position, and cooperating adjustable abutment means carried by said portions for locating the cam bar in the proper operative position.

24. In a turning tool adapted in use to cooperate with a cam bar, a follower carried by said tool and having a side adapted to contact the camming edge of said cam bar, and means for adjusting said follower to bring said side thereof into parallelism with said camming edge.

25. In a turning tool of the character described, a slide provided with a bore and an opening communicating therewith, a worm mounted in said bore for rotation therein and for axial movement with said slide, a movable support for carrying a cutting tool, operative connections between said support and said worm and including a worm wheel extending through said opening, means for rotating said worm to move said support, and means for moving said slide and worm endwise to also move said support.

26. In a turning tool of the character described, a slide provided with a bore and an opening communicating therewith, a worm interfitting said bore and rotatable therein and movable axially with said slide as a unit, means in said bore for resisting the end thrust of said worm, a movable support for carrying a cutting tool, operative connections between said support and said worm and including a worm wheel extending through said opening, means for rotating said worm to move said support, and means for moving said slide and worm endwise to also move said support.

MAX E. LANGE.
WILBUR C. DE GRAFF.